UNITED STATES PATENT OFFICE.

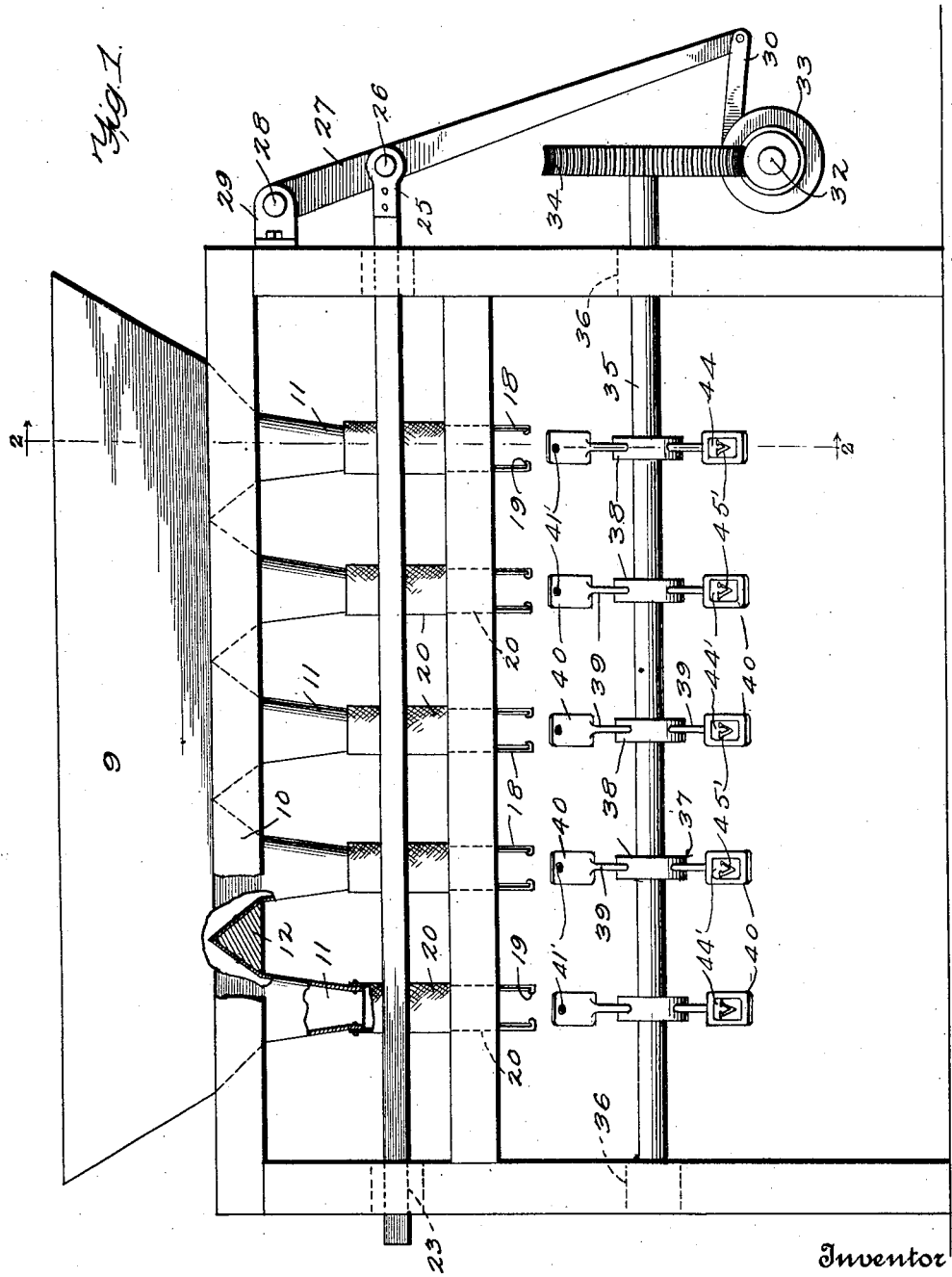

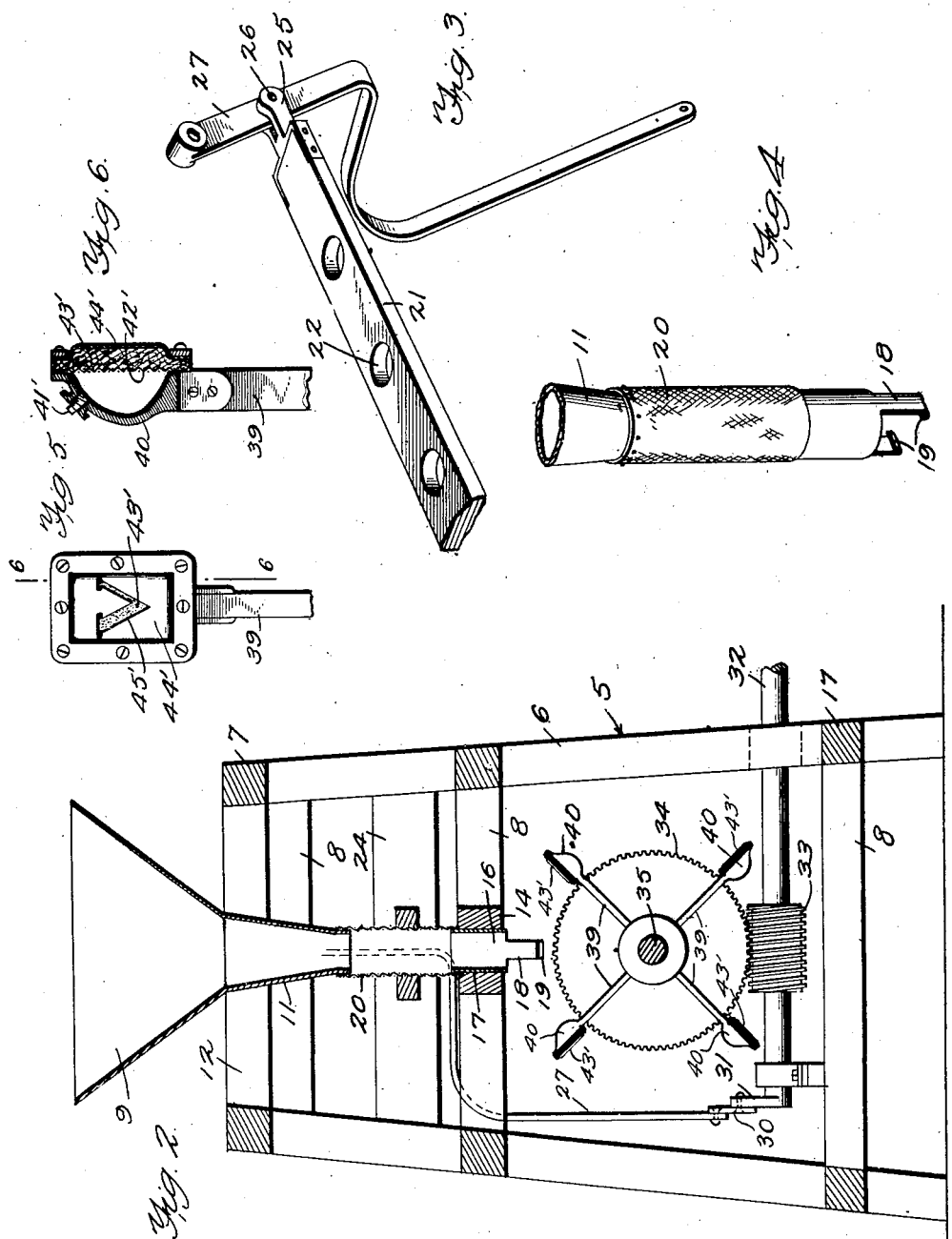

FRANKLIN GREAR NEAL, OF ST. LOUIS, MISSOURI.

MACHINE FOR APPLYING MARKS TO ARTICLES.

1,339,857. Specification of Letters Patent. Patented May 11, 1920.

Application filed May 12, 1919. Serial No. 296,667.

*To all whom it may concern:*

Be it known that I, FRANKLIN G. NEAL, a citizen of the United States, residing at St. Louis, State of Missouri, have invented certain new and useful Improvements in Machines for Applying Marks to Articles, of which the following is a specification.

My invention is a machine for applying a trade-mark, monogram or the like, upon relatively small articles such as fruits, nuts, vegetables, etc., which may be of irregular shape.

An important object of the invention is to provide a machine of the above-mentioned character, which is adapted to operate continuously and apply the trade-mark or the like upon the articles, in a rapid manner.

Other objects and advantages of the invention will be apparent during the course of the following description.

In the accompanying drawings forming a part of this specification, and in which like numerals are employed to designate like parts throughout the same:

Figure 1 is a side elevation of a machine embodying my invention;

Fig. 2 is a transverse sectional view, taken on line 2—2 of Fig. 1;

Fig. 3 is a perspective view of the shaker bar or element.

Fig. 4 is a fragmentary perspective showing the flexible couplings for the spouts, and Figs. 5 and 6 are detailed views showing the marking and ejecting members.

In the drawings, wherein for the purpose of illustration is shown a preferred embodiment of my invention, the numeral 5 designates a supporting frame, as a whole, comprising standards or posts 6, which are connected by longitudinal beams 7. These posts are also connected by transverse beams 8.

Arranged above this frame is a hopper 9, having lower tapered portions 10, carrying downwardly discharging outlet spouts 11. This hopper is supported and held in place by transverse members 12 secured to the upper longitudinal beams 7, and are anchored thereto, the hopper remaining stationary.

Extending longitudinally of the frame 7 and secured to the intermediate transverse beams 8 is a stationary support 14, having openings formed therein, arranged directly beneath the spouts 11. These openings receive stationary tubes 16 which project above the support 14, as shown. The tubes 16 carry pairs of spaced resilient clamps 18, provided with inturned ends or flanges 19. The clamps 18 extend transversely of the machine, as shown.

The numeral 20 designates flexible tubular couplings, the upper ends of which receive the spouts 11 and the lower ends the tubes 15.

Means are provided to shake or vibrate the flexible tubular couplings 20, comprising a shaker bar 21 having openings 22 which receive the couplings 20. This shaker bar is mounted to slide in slots 23 formed in transverse elements 24, attached to the ends of the frame. At one end, this shaker bar has connection with a bracket 25, pivoted as shown at 26, to the lever 27. This lever is pivoted at its upper end, as shown at 28, with a stationary bracket 29.

The lever 27 is rapidly oscillated by means of a pitman 30 pivoted to the lower end thereof, and having pivotal connection with a crank 31 rigidly secured to the motor shaft 32, which is driven at a relatively high speed.

This motor shaft is equipped with a worm 33 serving to drive a worm wheel 34, connected with a longitudinal shaft 35, journaled in bearings 36.

The shaft 35 carries a plurality of markers 37, each of which embodies a hub 38 rigidly secured to the shaft 35 and carrying radially extending arms 39. These arms are provided with marking elements 40. Each element 40 embodies a shell or body portion, to receive the fluid ink, and this shell has an inlet which is normally closed by a plug 41'. The forward face of the shell 40 is open and spanned by a section of wire gauze 42', upon which is arranged an absorbent pad 43'. A stencil plate 44' is arranged upon the pad 43', and has a marking opening 45', formed therein, as shown.

The elements 40 are adapted to be rotated between the resilient clamps 18 and first contact with one side of the article, such as a nut, thereby serving to apply the trade-mark or monogram to the same, and subsequently forcing the same from between the spring clamps, the second article passing downwardly between the spring clamps to be engaged by the succeeding element.

The operation of the apparatus is as follows:

The articles to be marked, such as nuts are introduced into the hopper 9, and discharged therefrom by gravity through the chutes 11 into the flexible couplings 20, which are rapidly vibrated thereby preventing the articles being clogged therein. The lowermost article gravitates into the space between the spring clamps 18 and is held therein until the element 40 contacts therewith, to form the trade-mark thereon, and subsequently expel the same from between the spring clamps, the next lowermost article then gravitating to the lowermost position between these spring clamps.

It is to be understood that the form of my invention herewith shown and described is to be taken as the preferred example of the same, and that various changes in the shape, size and arrangement of parts may be resorted to without departing from the spirit of the invention or the scope of the subjoined claims.

Having thus described my invention, I claim:

1. In a machine of the character described, a support, a receptacle connected with the support to receive the articles to be marked, an outlet tube connected with the receptacle to receive the articles therefrom, means to agitate the tube, means to receive and hold the article passing from the tube, and a movable marking element to contact with the article within the holding means to first apply the mark thereto and subsequently discharge the article from such holding means.

2. In a machine of the character described, a support, a hopper connected therewith and provided with a plurality of outlets, a plurality of flexible tubes connected with the outlets, means to vibrate the tubes, a plurality of holding devices connected with the lower ends of the tubes, and a plurality of rotatable marking elements arranged to operate within the holding devices.

3. In a machine of the character described, a hopper connected therewith and provided with a plurality of outlets, a plurality of flexible tubes connected with the outlets, a reciprocatory shaker bar having openings for receiving the flexible tubes, means to vibrate the shaker bar, a longitudinal support, a plurality of article holding devices carried by the longitudinal support and connected with the flexible tubes, a longitudinal drive shaft, means to rotate the drive shaft, and rotatable marking elements carried by the drive shaft to operate within the holding devices.

In testimony whereof I affix my signature in presence of two witnesses.

FRANKLIN GREAR NEAL.

Witnesses:
A. DICKMAN,
MARTIN H. REILLY.